US009129460B2

(12) United States Patent
McClellan et al.

(10) Patent No.: US 9,129,460 B2
(45) Date of Patent: Sep. 8, 2015

(54) SYSTEM AND METHOD FOR MONITORING AND IMPROVING DRIVER BEHAVIOR

(75) Inventors: Scott McClellan, Heber City, UT (US); Jonathan C. Catten, Salt Lake City, UT (US); Todd Follmer, Coto de Caza, CA (US)

(73) Assignee: inthinc Technology Solutions, Inc., West Valley City, UT (US)

( * ) Notice: Subject to any disclaimer, the term of this patent is extended or adjusted under 35 U.S.C. 154(b) by 1070 days.

(21) Appl. No.: 11/768,056

(22) Filed: Jun. 25, 2007

(65) Prior Publication Data

US 2008/0319602 A1 Dec. 25, 2008

(51) Int. Cl.

| | |
|---|---|
| ***G06F 7/00*** | (2006.01) |
| ***G07C 5/08*** | (2006.01) |
| ***G07C 5/00*** | (2006.01) |
| *G08G 1/052* | (2006.01) |
| *G08G 1/0967* | (2006.01) |

(52) U.S. Cl.

CPC ................ *G07C 5/085* (2013.01); *G07C 5/008* (2013.01); *G07C 5/0841* (2013.01); *G08G 1/052* (2013.01); *G08G 1/096708* (2013.01)

(58) Field of Classification Search

USPC ........ 701/29, 35, 29.1, 29.3, 29.6, 33, 36, 45, 701/33.6, 33.4, 32.1; 340/933, 438, 439

See application file for complete search history.

(56) References Cited

U.S. PATENT DOCUMENTS

| | | | |
|---|---|---|---|
| 3,975,708 | A | 8/1976 | Lusk |
| 4,344,136 | A | 8/1982 | Panik |
| 4,369,427 | A | 1/1983 | Drebinger et al. |
| 4,395,624 | A | 7/1983 | Wartski |
| 4,419,654 | A | 12/1983 | Funk |
| 4,458,535 | A | 7/1984 | Juergens |
| 4,591,823 | A | 5/1986 | Horvat |

(Continued)

FOREIGN PATENT DOCUMENTS

| | | | |
|---|---|---|---|
| CA | 2071931 | 12/1993 | |
| CA | 2 307 259 A1 | 10/2001 | ................ G01P 1/12 |

(Continued)

OTHER PUBLICATIONS

European Patent Office; European Search Report for Application No. 08779728.8-1229 / 2165321 PCT/US2008007820; 6 pages, Dec. 27, 2011.

(Continued)

*Primary Examiner* — John Q Nguyen
*Assistant Examiner* — Michael Ng
(74) *Attorney, Agent, or Firm* — Workman Nydegger

(57) ABSTRACT

System and method for providing feedback to drivers. The system monitors selected vehicle parameters while a vehicle is being driven, and detects one or more vehicle operation violations by comparing the selected vehicle parameters to predetermined thresholds. A mentoring message is provided to the driver if the threshold is exceeded. If a vehicle operation violation has not been corrected within a preselected time period, then a violation report may be sent to a third party or a central server and/or a different mentoring message may be provided to the driver. Vehicle parameter data may be monitored from an on-board vehicle diagnostic system. The mentoring message may be an audible warning, such as a spoken message, or a visual warning, such as a text message. The selected vehicle parameters may be a vehicle speed, a vehicle acceleration, or a vehicle seatbelt use.

44 Claims, 3 Drawing Sheets

(56) References Cited

U.S. PATENT DOCUMENTS 4,785,280 A 11/1988 Fubini
4,843,578 A 6/1989 Wade
4,926,417 A 5/1990 Futami
4,939,652 A 7/1990 Steiner
5,006,829 A 4/1991 Miyamoto et al.
5,032,821 A 7/1991 Domanico
5,064,151 A 11/1991 Cerimele et al.
5,074,144 A 12/1991 Krofchalk et al.
5,119,504 A 6/1992 Durboraw, III
5,223,844 A 6/1993 Mansell et al.
5,225,842 A 7/1993 Brown et al.
5,303,163 A 4/1994 Ebaugh et al. ................ 364/550
5,305,214 A 4/1994 Komatsu
5,309,139 A 5/1994 Austin
5,311,197 A 5/1994 Sorden et al.
5,325,082 A 6/1994 Rodriguez
5,347,260 A 9/1994 Ginzel
5,353,023 A 10/1994 Mitsugi
5,359,528 A 10/1994 Haendel
5,365,114 A 11/1994 Tsurushima
5,365,451 A 11/1994 Wang et al.
5,381,155 A 1/1995 Gerber
5,394,136 A 2/1995 Lammers
5,400,018 A 3/1995 Scholl
5,414,432 A 5/1995 Penny, Jr. et al.
5,422,624 A 6/1995 Smith
5,424,584 A 6/1995 Matsuda
5,430,432 A 7/1995 Camhi
5,436,612 A 7/1995 Aduddell
5,436,837 A 7/1995 Gerstung
5,446,659 A 8/1995 Yamawaki
5,453,939 A 9/1995 Hoffman
5,457,439 A 10/1995 Kuhn
5,475,597 A 12/1995 Buck
5,485,116 A 1/1996 Cserveny et al.
5,485,161 A 1/1996 Vaughn
5,499,182 A 3/1996 Ousborne
5,521,579 A 5/1996 Bernhard
5,521,580 A 5/1996 Kaneko
5,525,960 A 6/1996 McCall
5,546,305 A 8/1996 Kondo
5,548,273 A * 8/1996 Nicol et al. ................... 340/439
5,570,087 A 10/1996 Lemelson
5,581,464 A 12/1996 Woll
5,586,130 A 12/1996 Doyle
5,600,558 A 2/1997 Mearek
5,612,875 A 3/1997 Haendel
5,617,086 A 4/1997 Klashinsky et al.
5,625,337 A 4/1997 Medawar
5,638,077 A 6/1997 Martin
5,642,284 A 6/1997 Parupalli
5,648,755 A 7/1997 Yagihashi
5,659,289 A 8/1997 Zonkoski
5,689,067 A 11/1997 Klein
5,708,417 A 1/1998 Tallman
5,717,374 A 2/1998 Smith
5,719,771 A 2/1998 Buck
5,723,768 A 3/1998 Ammon
5,731,285 A 3/1998 Pavone et al.
5,731,785 A 3/1998 Lemelson et al.
5,740,548 A 4/1998 Hudgens
5,742,915 A 4/1998 Stafford
5,751,245 A 5/1998 Janky et al.
5,764,139 A 6/1998 Nojima
5,767,767 A 6/1998 Lima
5,777,580 A 7/1998 Janky et al.
5,795,997 A 8/1998 Gittins
5,797,134 A 8/1998 McMillan et al.
5,801,618 A 9/1998 Jenkins
5,801,948 A 9/1998 Wood
5,815,071 A 9/1998 Doyle
5,819,090 A 10/1998 Wolf et al.
5,819,198 A * 10/1998 Peretz ........................... 701/117
5,825,283 A 10/1998 Camhi
5,825,284 A 10/1998 Dunwoody
5,829,782 A * 11/1998 Breed et al. ................... 280/735
5,844,475 A 12/1998 Horie
5,847,271 A 12/1998 Poublon
5,862,500 A 1/1999 Goodwin
5,867,093 A 2/1999 Dodd
5,877,678 A 3/1999 Donoho
5,880,674 A 3/1999 Ufkes
5,880,958 A 3/1999 Helms et al.
5,883,594 A 3/1999 Lau
5,892,434 A 4/1999 Carlson
5,907,277 A 5/1999 Tokunaga
5,914,654 A 6/1999 Smith
5,918,180 A 6/1999 Dimino
5,926,087 A 7/1999 Busch
5,928,291 A 7/1999 Jenkins et al.
5,933,080 A 8/1999 Nojima
5,941,915 A 8/1999 Federle et al. .................... 701/1
5,945,919 A 8/1999 Trask
5,949,330 A 9/1999 Hoffman
5,949,331 A 9/1999 Schofield
5,952,941 A 9/1999 Mardirossian
5,954,781 A 9/1999 Slepian
5,955,942 A 9/1999 Slifkin
5,957,986 A 9/1999 Coverdill
5,964,816 A 10/1999 Kincaid
5,969,600 A 10/1999 Tanguay
5,974,356 A 10/1999 Doyle et al.
5,978,737 A 11/1999 Pawlowski
5,982,278 A 11/1999 Cuvelier
5,987,976 A 11/1999 Sarangapani
5,999,125 A 12/1999 Kurby
6,002,327 A 12/1999 Boesch
6,008,724 A 12/1999 Thompson
6,018,293 A 1/2000 Smith
6,026,292 A 2/2000 Coppinger et al.
6,028,508 A 2/2000 Mason
6,028,510 A 2/2000 Tamam
6,037,861 A 3/2000 Ying
6,037,862 A 3/2000 Ying
6,038,496 A 3/2000 Dobler
6,044,315 A 3/2000 Honeck
6,059,066 A 5/2000 Lary
6,060,989 A 5/2000 Gehlot
6,064,886 A 5/2000 Perez et al.
6,064,928 A 5/2000 Wilson
6,064,970 A 5/2000 McMillan et al.
6,067,008 A 5/2000 Smith
6,067,009 A 5/2000 Hozuka
6,072,388 A 6/2000 Kyrtsos
6,073,007 A 6/2000 Doyle
6,075,458 A 6/2000 Ladner et al.
6,078,853 A 6/2000 Ebner
6,081,188 A 6/2000 Kutlucinar
6,084,870 A 7/2000 Wooten et al.
6,094,149 A 7/2000 Wilson
6,098,048 A 8/2000 Dashefsky
6,100,792 A 8/2000 Ogino
6,104,282 A 8/2000 Fragoso
6,108,591 A 8/2000 Segal et al.
6,112,145 A 8/2000 Zachman
6,121,922 A 9/2000 Mohan
6,122,591 A 9/2000 Pomerantz
6,124,810 A 9/2000 Segal et al.
6,130,608 A 10/2000 McKeown
6,131,067 A 10/2000 Girerd et al.
6,133,827 A 10/2000 Alvey
6,138,516 A 10/2000 Tillman
6,141,610 A 10/2000 Rothert
6,147,598 A 11/2000 Murphy
6,161,072 A 12/2000 Clapper
6,172,602 B1 1/2001 Hasfjord
6,178,374 B1 1/2001 Möhlenkamp et al. ....... 701/117
6,184,784 B1 2/2001 Shibuya
6,185,501 B1 2/2001 Smith
6,195,015 B1 2/2001 Jacobs et al.
6,198,995 B1 3/2001 Settles
6,204,756 B1 3/2001 Senyk
6,204,757 B1 3/2001 Evans
6,208,240 B1 3/2001 Ledesma

(56) References Cited

U.S. PATENT DOCUMENTS

| | | | | |
|---|---|---|---|---|
| 6,212,455 | B1 | 4/2001 | Weaver | |
| 6,216,066 | B1 | 4/2001 | Goebel | |
| 6,222,458 | B1 | 4/2001 | Harris | |
| 6,225,898 | B1 | 5/2001 | Kamiya | |
| 6,227,862 | B1 | 5/2001 | Harkness | |
| 6,229,438 | B1 | 5/2001 | Kutlucinar | |
| 6,232,873 | B1 | 5/2001 | Dilz | |
| 6,246,933 | B1 | 6/2001 | Bague | |
| 6,246,948 | B1 * | 6/2001 | Thakker | 701/93 |
| 6,247,360 | B1 | 6/2001 | Anderson | |
| 6,249,219 | B1 | 6/2001 | Perez | |
| 6,253,129 | B1 | 6/2001 | Jenkins et al. | |
| 6,253,151 | B1 | 6/2001 | Ohler et al. | |
| 6,255,892 | B1 | 7/2001 | Gartner | |
| 6,255,939 | B1 | 7/2001 | Roth | |
| 6,262,657 | B1 | 7/2001 | Okuda et al. | |
| 6,262,658 | B1 | 7/2001 | O'Connor | |
| 6,265,989 | B1 | 7/2001 | Taylor | |
| 6,266,588 | B1 | 7/2001 | McClellan | |
| 6,278,361 | B1 | 8/2001 | Magiawala | |
| 6,282,491 | B1 | 8/2001 | Bochmann et al. | |
| 6,285,931 | B1 | 9/2001 | Hattori | |
| 6,289,332 | B2 | 9/2001 | Menig | |
| 6,294,988 | B1 | 9/2001 | Shomura | |
| 6,294,989 | B1 | 9/2001 | Schofield | |
| 6,295,492 | B1 | 9/2001 | Lang | |
| 6,297,768 | B1 | 10/2001 | Allen, Jr. | |
| 6,301,533 | B1 | 10/2001 | Markow | |
| 6,306,063 | B1 | 10/2001 | Horgan et al. | 477/108 |
| 6,308,120 | B1 | 10/2001 | Good | |
| 6,308,134 | B1 | 10/2001 | Croyle et al. | |
| 6,313,742 | B1 | 11/2001 | Larson | |
| 6,314,367 | B1 | 11/2001 | Ohler et al. | |
| 6,320,497 | B1 | 11/2001 | Fukumoto | |
| 6,331,825 | B1 | 12/2001 | Ladner et al. | |
| 6,333,686 | B1 | 12/2001 | Waltzer | |
| 6,337,653 | B1 | 1/2002 | Bchler | |
| 6,339,739 | B1 | 1/2002 | Folke | |
| 6,339,745 | B1 | 1/2002 | Novik | 701/208 |
| 6,343,301 | B1 | 1/2002 | Halt et al. | |
| 6,344,805 | B1 | 2/2002 | Yasui | |
| 6,351,211 | B1 | 2/2002 | Bussard | |
| 6,351,709 | B2 | 2/2002 | King et al. | |
| 6,356,188 | B1 | 3/2002 | Meyers | |
| 6,356,822 | B1 | 3/2002 | Diaz | |
| 6,356,833 | B2 | 3/2002 | Jeon | |
| 6,356,836 | B1 | 3/2002 | Adolph | 701/208 |
| 6,359,554 | B1 | 3/2002 | Skibinski | |
| 6,362,730 | B2 | 3/2002 | Razavi | |
| 6,362,734 | B1 | 3/2002 | McQuade | |
| 6,366,199 | B1 | 4/2002 | Osborn | |
| 6,366,207 | B1 | 4/2002 | Murphy | |
| 6,378,959 | B2 | 4/2002 | Lesesky | |
| 6,385,533 | B1 | 5/2002 | Halt et al. | |
| 6,389,340 | B1 | 5/2002 | Rayner | |
| 6,393,348 | B1 | 5/2002 | Ziegler | |
| 6,401,029 | B1 * | 6/2002 | Kubota et al. | 701/201 |
| 6,404,329 | B1 | 6/2002 | Hsu | |
| 6,405,112 | B1 | 6/2002 | Rayner | |
| 6,405,128 | B1 | 6/2002 | Bechtolsheim et al. | 701/208 |
| 6,415,226 | B1 | 7/2002 | Kozak | 701/210 |
| 6,417,764 | B2 | 7/2002 | Tonkin | |
| 6,424,268 | B1 | 7/2002 | Isonaga | |
| 6,427,687 | B1 | 8/2002 | Kirk | |
| 6,430,488 | B1 | 8/2002 | Goldman | |
| 6,433,681 | B1 | 8/2002 | Foo | |
| 6,438,472 | B1 * | 8/2002 | Tano et al. | 701/35 |
| 6,441,732 | B1 | 8/2002 | Laitsaari | |
| 6,449,540 | B1 | 9/2002 | Rayner | |
| 6,459,365 | B2 * | 10/2002 | Tamura | 340/425.5 |
| 6,459,367 | B1 | 10/2002 | Green | |
| 6,459,369 | B1 | 10/2002 | Wang | |
| 6,459,961 | B1 | 10/2002 | Obradovich | |
| 6,459,969 | B1 | 10/2002 | Bates | |
| 6,462,675 | B1 | 10/2002 | Humphrey | |
| 6,472,979 | B2 | 10/2002 | Schofield | |
| 6,476,763 | B2 | 11/2002 | Allen, Jr. | |
| 6,480,106 | B1 | 11/2002 | Crombez | |
| 6,484,035 | B2 | 11/2002 | Allen, Jr. | |
| 6,484,091 | B2 | 11/2002 | Shibata | |
| 6,493,650 | B1 | 12/2002 | Rodgers | |
| 6,512,969 | B1 | 1/2003 | Wang | |
| 6,515,596 | B2 | 2/2003 | Awada | |
| 6,519,512 | B1 | 2/2003 | Haas | |
| 6,523,912 | B1 | 2/2003 | Bond et al. | |
| 6,525,672 | B2 | 2/2003 | Chainer | |
| 6,526,341 | B1 | 2/2003 | Bird et al. | |
| 6,529,159 | B1 | 3/2003 | Fan et al. | |
| 6,535,116 | B1 | 3/2003 | Zhou | |
| 6,542,074 | B1 | 4/2003 | Tharman | |
| 6,542,794 | B2 | 4/2003 | Obradovich | |
| 6,549,834 | B2 | 4/2003 | McClellan et al. | |
| 6,552,682 | B1 | 4/2003 | Fan | |
| 6,556,905 | B1 | 4/2003 | Mittelsteadt | |
| 6,559,769 | B2 | 5/2003 | Anthony | |
| 6,564,126 | B1 | 5/2003 | Lin | |
| 6,567,000 | B2 | 5/2003 | Slifkin | |
| 6,571,168 | B1 | 5/2003 | Murphy | |
| 6,587,759 | B2 | 7/2003 | Obradovich | |
| 6,594,579 | B1 | 7/2003 | Lowrey | |
| 6,599,243 | B2 * | 7/2003 | Woltermann et al. | 600/300 |
| 6,600,985 | B2 | 7/2003 | Weaver | |
| 6,604,033 | B1 | 8/2003 | Banet | |
| 6,609,063 | B1 | 8/2003 | Bender et al. | 701/209 |
| 6,609,064 | B1 | 8/2003 | Dean | 701/213 |
| 6,611,740 | B2 | 8/2003 | Lowrey | |
| 6,611,755 | B1 | 8/2003 | Coffee | |
| 6,615,137 | B2 | 9/2003 | Lutter et al. | |
| 6,622,085 | B1 | 9/2003 | Amita et al. | 701/208 |
| 6,629,029 | B1 * | 9/2003 | Giles | 701/31.4 |
| 6,630,884 | B1 | 10/2003 | Shanmugham | |
| 6,631,322 | B1 | 10/2003 | Arthur et al. | 701/211 |
| 6,633,811 | B1 | 10/2003 | Aumayer | |
| 6,636,790 | B1 | 10/2003 | Lightner | |
| 6,639,512 | B1 | 10/2003 | Lee | |
| 6,643,578 | B2 | 11/2003 | Levine | |
| 6,651,001 | B2 | 11/2003 | Apsell | |
| 6,654,682 | B2 | 11/2003 | Kane et al. | |
| 6,657,540 | B2 | 12/2003 | Knapp | |
| 6,662,013 | B2 | 12/2003 | Takiguchi et al. | |
| 6,662,141 | B2 | 12/2003 | Kaub | 702/181 |
| 6,664,922 | B1 | 12/2003 | Fan | |
| 6,665,613 | B2 | 12/2003 | Duvall | |
| 6,674,362 | B2 | 1/2004 | Yoshioka | |
| 6,675,085 | B2 | 1/2004 | Straub | |
| 6,677,854 | B2 | 1/2004 | Dix | |
| 6,678,612 | B1 | 1/2004 | Khawam | |
| 6,696,932 | B2 | 2/2004 | Skibinski | |
| 6,701,234 | B1 | 3/2004 | Vogelsang | |
| 6,703,925 | B2 | 3/2004 | Steffel | |
| 6,710,738 | B2 | 3/2004 | Allen, Jr. | |
| 6,714,894 | B1 | 3/2004 | Tobey et al. | 702/188 |
| 6,718,235 | B1 | 4/2004 | Borugian | |
| 6,718,239 | B2 | 4/2004 | Rayner | |
| 6,718,258 | B1 | 4/2004 | Barton | |
| 6,720,889 | B2 | 4/2004 | Yamaki et al. | |
| 6,727,809 | B1 | 4/2004 | Smith | |
| 6,728,542 | B2 | 4/2004 | Meda | |
| 6,728,605 | B2 | 4/2004 | Lash | |
| 6,732,031 | B1 | 5/2004 | Lightner | |
| 6,732,032 | B1 | 5/2004 | Banet | |
| 6,737,962 | B2 | 5/2004 | Mayor | |
| 6,741,169 | B2 | 5/2004 | Magiawala | |
| 6,741,170 | B2 | 5/2004 | Alrabady | |
| 6,745,153 | B2 | 6/2004 | White | |
| 6,748,322 | B1 | 6/2004 | Fernandez | |
| 6,750,761 | B1 | 6/2004 | Newman | |
| 6,750,762 | B1 | 6/2004 | Porter | |
| 6,756,916 | B2 | 6/2004 | Yanai | |
| 6,759,952 | B2 | 7/2004 | Dunbridge | |
| 6,766,244 | B2 | 7/2004 | Obata et al. | 701/207 |
| 6,768,448 | B2 | 7/2004 | Farmer | |
| 6,775,602 | B2 | 8/2004 | Gordon | |
| 6,778,068 | B2 | 8/2004 | Wolfe | |

(56) References Cited

U.S. PATENT DOCUMENTS 6,778,885 B2 8/2004 Agashe et al.
6,784,793 B2 8/2004 Gagnon
6,784,832 B2 8/2004 Knockeart et al.
6,788,196 B2 9/2004 Ueda
6,788,207 B2 9/2004 Wilkerson
6,792,339 B2 9/2004 Basson
6,795,017 B1 9/2004 Puranik et al.
6,798,354 B2 9/2004 Schuessler
6,803,854 B1 10/2004 Adams et al.
6,807,481 B1 10/2004 Gastelum
6,813,549 B2 11/2004 Good
6,819,236 B2 11/2004 Kawai
6,822,557 B1 11/2004 Weber
6,832,141 B2 12/2004 Skeen et al.
6,845,314 B2 1/2005 Fosseen
6,845,316 B2 1/2005 Yates ............................ 701/117
6,845,317 B2 1/2005 Craine
6,847,871 B2 1/2005 Malik et al. ..................... 701/33
6,847,872 B2 1/2005 Bodin
6,847,873 B1 1/2005 Li
6,847,887 B1 1/2005 Casino .......................... 701/208
6,850,841 B1 2/2005 Casino .......................... 701/208
6,853,910 B1 2/2005 Oesterling
6,859,039 B2 2/2005 Horie
6,859,695 B2 2/2005 Klausner
6,865,457 B1 3/2005 Mittelsteadt
6,867,733 B2 3/2005 Sandhu et al.
6,868,386 B1 3/2005 Henderson et al.
6,870,469 B2 3/2005 Ueda
6,873,253 B2 3/2005 Veziris
6,873,261 B2 3/2005 Anthony
6,873,998 B1 3/2005 Dorum et al.
6,877,007 B1 4/2005 Hentzel et al.
6,879,894 B1 4/2005 Lightner
6,885,293 B2 4/2005 Okumura
6,888,495 B2 5/2005 Flick
6,892,131 B2 5/2005 Coffee
6,894,606 B2 5/2005 Forbes et al. ................. 340/435
6,895,332 B2 5/2005 King
6,909,398 B2 6/2005 Knockeart et al.
6,909,947 B2 6/2005 Douros et al.
6,914,523 B2 7/2005 Munch
6,922,133 B2 7/2005 Wolfe
6,922,616 B2 7/2005 Obradovich
6,922,622 B2 7/2005 Dulin
6,925,425 B2 8/2005 Remboski
6,928,348 B1 8/2005 Lightner
6,931,309 B2 8/2005 Phelan et al.
6,934,611 B2 * 8/2005 McKeown et al. .............. 701/29
6,937,162 B2 8/2005 Tokitsu
6,950,013 B2 9/2005 Scaman
6,954,140 B2 10/2005 Holler
6,957,133 B1 10/2005 Hunt et al.
6,958,976 B2 10/2005 Kikkawa
6,960,168 B2 * 11/2005 Yanagidaira et al. ......... 600/300
6,965,827 B1 11/2005 Wolfson ........................ 701/207
6,968,311 B2 11/2005 Knockeart et al.
6,970,075 B2 11/2005 Cherouny
6,970,783 B2 11/2005 Knockeart et al.
6,972,669 B2 12/2005 Saito
6,980,131 B1 12/2005 Taylor
6,981,565 B2 1/2006 Gleacher
6,982,636 B1 1/2006 Bennie
6,983,200 B2 1/2006 Bodin
6,988,033 B1 1/2006 Lowrey
6,988,034 B1 1/2006 Marlatt et al. ................ 701/200
6,989,739 B2 1/2006 Li
7,002,454 B1 2/2006 Gustafson
7,002,579 B2 2/2006 Olson
7,005,975 B2 2/2006 Lehner
7,006,820 B1 2/2006 Parker et al.
7,019,641 B1 3/2006 Lakshmanan
7,023,321 B2 4/2006 Brillon et al.
7,023,332 B2 4/2006 Saito
7,024,318 B2 4/2006 Fischer
7,027,808 B2 4/2006 Wesby
7,034,705 B2 4/2006 Yoshioka
7,038,578 B2 5/2006 Will
7,042,347 B2 5/2006 Cherouny
7,047,114 B1 5/2006 Rogers
7,049,941 B2 5/2006 Rivera-Cintron
7,054,742 B2 5/2006 Khavakh et al. .............. 701/209
7,059,689 B2 6/2006 Lesesky
7,069,126 B2 6/2006 Bernard
7,069,134 B2 6/2006 Williams
7,072,753 B2 7/2006 Eberle
7,081,811 B2 7/2006 Johnston
7,084,755 B1 8/2006 Nord
7,088,225 B2 8/2006 Yoshioka
7,089,116 B2 8/2006 Smith
7,091,880 B2 8/2006 Sorensen
7,098,812 B2 8/2006 Hirota
7,099,750 B2 8/2006 Miyazawa
7,099,774 B2 8/2006 King
7,102,496 B1 9/2006 Ernst
7,109,850 B2 * 9/2006 Kawazoe et al. .......... 340/425.5
7,109,853 B1 9/2006 Mattson
7,113,081 B1 9/2006 Reichow
7,113,107 B2 9/2006 Taylor
7,113,127 B1 9/2006 Banet et al.
7,117,075 B1 10/2006 Larschan et al.
7,119,696 B2 10/2006 Borugian
7,124,027 B1 10/2006 Ernst
7,124,088 B2 10/2006 Bauer et al.
7,129,825 B2 10/2006 Weber
7,132,934 B2 11/2006 Allison
7,132,937 B2 11/2006 Lu
7,132,938 B2 11/2006 Suzuki
7,133,755 B2 11/2006 Salman
7,135,983 B2 11/2006 Filippov
7,138,916 B2 11/2006 Schwartz
7,139,661 B2 11/2006 Holze
7,142,196 B1 11/2006 Connor et al.
7,145,442 B1 12/2006 Wai
7,149,206 B2 12/2006 Pruzan
7,155,259 B2 12/2006 Bauchot et al.
7,155,321 B2 12/2006 Bromley et al. ................ 701/29
7,161,473 B2 1/2007 Hoshal
7,164,986 B2 1/2007 Humphries
7,170,390 B2 1/2007 Quiñones
7,170,400 B2 1/2007 Cowelchuk
7,174,243 B1 2/2007 Lightner
7,176,813 B2 2/2007 Kawamata et al.
7,180,407 B1 2/2007 Guo
7,180,409 B2 2/2007 Brey
7,183,942 B2 2/2007 Rock et al.
7,187,271 B2 3/2007 Nagata
7,188,025 B2 3/2007 Hudson, Jr.
7,196,629 B2 3/2007 Ruoss
7,197,500 B1 3/2007 Israni et al. ................... 707/100
7,216,022 B2 5/2007 Kynast et al. ..................... 701/1
7,216,035 B2 5/2007 Hörtner
7,218,211 B2 5/2007 Ho
7,222,009 B2 5/2007 Hijikata
7,225,060 B2 5/2007 O'Connor et al.
7,225,065 B1 5/2007 Hunt
7,228,211 B1 6/2007 Lowrey
7,233,235 B2 6/2007 Pavlish
7,236,862 B2 6/2007 Kanno
7,239,948 B2 7/2007 Nimmo
7,256,686 B2 8/2007 Koutsky
7,256,700 B1 8/2007 Ruocco
7,256,702 B2 8/2007 Isaacs
7,260,497 B2 8/2007 Watabe
RE39,845 E 9/2007 Hasfjord
7,269,507 B2 9/2007 Cayford ........................ 701/208
7,269,530 B1 9/2007 Lin
7,271,716 B2 9/2007 Nou
7,273,172 B2 9/2007 Olsen
7,280,046 B2 10/2007 Berg
7,283,904 B2 10/2007 Benjamin
7,286,917 B2 10/2007 Hawkins
7,286,929 B2 10/2007 Staton
7,289,024 B2 10/2007 Sumcad

(56) References Cited

U.S. PATENT DOCUMENTS

| | | | | |
|---|---|---|---|---|
| 7,289,035 | B2 | 10/2007 | Nathan | |
| 7,292,152 | B2 | 11/2007 | Torkkola | |
| 7,292,159 | B2 | 11/2007 | Culpepper | |
| 7,295,921 | B2 | 11/2007 | Spencer et al. | |
| 7,298,248 | B2 | 11/2007 | Finley | |
| 7,298,249 | B2 | 11/2007 | Avery | |
| 7,301,445 | B2 | 11/2007 | Moughler | |
| 7,317,383 | B2 | 1/2008 | Ihara | |
| 7,317,392 | B2 | 1/2008 | DuRocher | |
| 7,317,927 | B2 | 1/2008 | Staton | |
| 7,319,848 | B2 | 1/2008 | Obradovich | |
| 7,321,294 | B2 | 1/2008 | Mizumaki | |
| 7,321,825 | B2 | 1/2008 | Ranalli | |
| 7,323,972 | B2 | 1/2008 | Nobusawa | |
| 7,323,974 | B2 | 1/2008 | Schmid | |
| 7,323,982 | B2 | 1/2008 | Staton | |
| 7,327,239 | B2 | 2/2008 | Gallant | |
| 7,327,258 | B2 | 2/2008 | Fast | |
| 7,333,883 | B2 | 2/2008 | Geborek | |
| 7,339,460 | B2 | 3/2008 | Lane | |
| 7,349,782 | B2 | 3/2008 | Churchill | |
| 7,352,081 | B2 | 4/2008 | Taurasi | |
| 7,355,508 | B2 | 4/2008 | Mian | |
| 7,362,239 | B2 | 4/2008 | Franczyk et al. | |
| 7,365,639 | B2 | 4/2008 | Yuhara | |
| 7,366,551 | B1 | 4/2008 | Hartley | |
| 7,375,624 | B2 * | 5/2008 | Hines et al. | 340/438 |
| 7,376,499 | B2 | 5/2008 | Salman | |
| 7,378,946 | B2 | 5/2008 | Lahr | |
| 7,378,949 | B2 | 5/2008 | Chen | |
| 7,386,394 | B2 | 6/2008 | Shulman | |
| 7,397,363 | B2 | 7/2008 | Joao | |
| 7,398,153 | B2 | 7/2008 | Workman et al. | |
| 7,421,334 | B2 | 9/2008 | Dahlgren et al. | 701/117 |
| 7,433,889 | B1 | 10/2008 | Barton | 707/104.1 |
| 7,447,509 | B2 | 11/2008 | Cossins et al. | 455/457 |
| 7,474,264 | B2 | 1/2009 | Bolduc et al. | |
| 7,474,269 | B2 | 1/2009 | Mayer et al. | |
| 7,495,547 | B2 | 2/2009 | Lich et al. | |
| 7,499,949 | B2 | 3/2009 | Barton | 707/104.1 |
| 7,565,230 | B2 | 7/2009 | Gardner et al. | 701/35 |
| 7,584,033 | B2 | 9/2009 | Middelsteadt et al. | |
| 7,589,643 | B2 | 9/2009 | Dagei et al. | |
| 7,660,658 | B2 | 2/2010 | Sheynblat | |
| 7,671,727 | B2 | 3/2010 | Flick | |
| 7,671,752 | B2 | 3/2010 | Sofer | |
| 7,697,917 | B2 | 4/2010 | Camp et al. | |
| 7,739,036 | B2 | 6/2010 | Grimm et al. | |
| 7,747,410 | B2 | 6/2010 | Van Esch | |
| 7,783,406 | B2 | 8/2010 | Rothschild | |
| 7,821,421 | B2 | 10/2010 | Tamir et al. | |
| 7,859,392 | B2 | 12/2010 | McClellan et al. | |
| 7,880,642 | B2 | 2/2011 | Gueziec | 340/905 |
| 7,898,388 | B2 | 3/2011 | Ehrman et al. | 340/5.8 |
| 7,941,258 | B1 | 5/2011 | Mittelsteadt et al. | 701/35 |
| 8,044,809 | B2 | 10/2011 | Farmer | |
| 8,090,598 | B2 | 1/2012 | Bauer et al. | |
| 8,188,887 | B2 | 5/2012 | Catten et al. | |
| 8,314,708 | B2 | 11/2012 | Gunderson et al. | |
| 8,428,307 | B2 | 4/2013 | Bradai et al. | |
| 8,630,768 | B2 | 1/2014 | McClellan et al. | |
| 2001/0014849 | A1 | 8/2001 | King et al. | |
| 2001/0018628 | A1 | 8/2001 | Jenkins et al. | 701/35 |
| 2001/0048364 | A1 | 12/2001 | Kalthoff et al. | |
| 2002/0019703 | A1 * | 2/2002 | Levine | 701/301 |
| 2002/0024444 | A1 | 2/2002 | Hiyama et al. | 340/576 |
| 2002/0026334 | A1 | 2/2002 | Igoe | |
| 2002/0029226 | A1 | 3/2002 | Li et al. | |
| 2002/0111725 | A1 * | 8/2002 | Burge | 701/29 |
| 2002/0111844 | A1 | 8/2002 | Vanstory et al. | |
| 2002/0116228 | A1 | 8/2002 | Bauer et al. | |
| 2002/0120371 | A1 | 8/2002 | Leivian et al. | |
| 2002/0126023 | A1 | 9/2002 | Awada | |
| 2002/0128000 | A1 | 9/2002 | do Nascimento | |
| 2002/0173881 | A1 | 11/2002 | Lash et al. | |
| 2003/0016636 | A1 * | 1/2003 | Tari et al. | 370/328 |
| 2003/0045273 | A1 | 3/2003 | Pyhalammi et al. | |
| 2003/0052797 | A1 | 3/2003 | Rock et al. | |
| 2003/0055555 | A1 | 3/2003 | Knockeart et al. | |
| 2003/0060950 | A1 * | 3/2003 | McKeown et al. | 701/29 |
| 2003/0125854 | A1 | 7/2003 | Kawasaki et al. | |
| 2003/0134660 | A1 | 7/2003 | Himmel et al. | |
| 2003/0169185 | A1 * | 9/2003 | Taylor | 340/945 |
| 2003/0191564 | A1 | 10/2003 | Haugse et al. | |
| 2004/0039504 | A1 | 2/2004 | Coffee et al. | |
| 2004/0039609 | A1 | 2/2004 | Burkitt | |
| 2004/0054687 | A1 | 3/2004 | McDonough | |
| 2004/0056779 | A1 | 3/2004 | Rast | |
| 2004/0066330 | A1 | 4/2004 | Knockeart et al. | |
| 2004/0077339 | A1 | 4/2004 | Martens | |
| 2004/0083041 | A1 | 4/2004 | Skeen et al. | |
| 2004/0107037 | A1 | 6/2004 | Straub | |
| 2004/0107220 | A1 | 6/2004 | Natesan et al. | |
| 2004/0139034 | A1 | 7/2004 | Farmer | |
| 2004/0142672 | A1 | 7/2004 | Stankewitz | |
| 2004/0153362 | A1 * | 8/2004 | Bauer et al. | 705/10 |
| 2004/0172418 | A1 | 9/2004 | Dorum et al. | |
| 2004/0176083 | A1 | 9/2004 | Shiao et al. | |
| 2004/0186661 | A1 | 9/2004 | Barton | |
| 2004/0210353 | A1 | 10/2004 | Rice | 701/1 |
| 2004/0225557 | A1 | 11/2004 | Phelan et al. | |
| 2004/0236474 | A1 | 11/2004 | Chowdhary et al. | 701/1 |
| 2004/0236475 | A1 | 11/2004 | Chowdhary | |
| 2004/0252027 | A1 | 12/2004 | Torkkola et al. | |
| 2004/0254698 | A1 | 12/2004 | Hubbard et al. | |
| 2004/0257245 | A1 | 12/2004 | Jo | |
| 2004/0260579 | A1 | 12/2004 | Tremiti | |
| 2005/0021270 | A1 * | 1/2005 | Hong et al. | 702/96 |
| 2005/0049765 | A1 | 3/2005 | Chetia et al. | |
| 2005/0064835 | A1 | 3/2005 | Gusler | |
| 2005/0065711 | A1 | 3/2005 | Dahlgren et al. | |
| 2005/0070245 | A1 | 3/2005 | Nath et al. | |
| 2005/0091018 | A1 * | 4/2005 | Craft | 703/8 |
| 2005/0091175 | A9 | 4/2005 | Farmer | |
| 2005/0096809 | A1 | 5/2005 | Skeen et al. | |
| 2005/0102098 | A1 | 5/2005 | Montealegre et al. | |
| 2005/0107944 | A1 | 5/2005 | Hovestadt et al. | |
| 2005/0119002 | A1 | 6/2005 | Bauchot et al. | |
| 2005/0131597 | A1 * | 6/2005 | Raz et al. | 701/29 |
| 2005/0137757 | A1 | 6/2005 | Phelan et al. | |
| 2005/0143903 | A1 | 6/2005 | Park et al. | |
| 2005/0171663 | A1 * | 8/2005 | Mittelsteadt et al. | 701/35 |
| 2005/0184860 | A1 | 8/2005 | Taruki et al. | |
| 2005/0273218 | A1 | 12/2005 | Breed et al. | |
| 2006/0022842 | A1 | 2/2006 | Zoladeck et al. | |
| 2006/0025894 | A1 | 2/2006 | Oconner et al. | |
| 2006/0053038 | A1 | 3/2006 | Warren et al. | |
| 2006/0055565 | A1 | 3/2006 | Kawamata et al. | |
| 2006/0112573 | A1 | 6/2006 | Hillman et al. | |
| 2006/0121951 | A1 | 6/2006 | Perdomo et al. | |
| 2006/0154687 | A1 | 7/2006 | McDowell | |
| 2006/0193749 | A1 | 8/2006 | Ghazarian et al. | |
| 2006/0208169 | A1 | 9/2006 | Breed et al. | |
| 2006/0220905 | A1 | 10/2006 | Hovestadt | |
| 2006/0224306 | A1 | 10/2006 | Workman et al. | |
| 2006/0234711 | A1 | 10/2006 | McArdle | |
| 2006/0253307 | A1 | 11/2006 | Warren et al. | |
| 2006/0265125 | A1 | 11/2006 | Glaza | |
| 2007/0005404 | A1 * | 1/2007 | Raz et al. | 705/4 |
| 2007/0005609 | A1 | 1/2007 | Breed | |
| 2007/0027583 | A1 | 2/2007 | Tamir et al. | |
| 2007/0027726 | A1 | 2/2007 | Warren et al. | |
| 2007/0050130 | A1 | 3/2007 | Grimm et al. | |
| 2007/0057781 | A1 * | 3/2007 | Breed | 340/457.1 |
| 2007/0061155 | A1 | 3/2007 | Ji et al. | |
| 2007/0126601 | A1 * | 6/2007 | Park | 340/936 |
| 2007/0139189 | A1 | 6/2007 | Helmig | |
| 2007/0186923 | A1 | 8/2007 | Poutiatine et al. | |
| 2007/0202929 | A1 | 8/2007 | Satake | |
| 2007/0229234 | A1 | 10/2007 | Smith | |
| 2007/0236342 | A1 | 10/2007 | Hines et al. | |
| 2007/0260363 | A1 * | 11/2007 | Miller | 701/2 |
| 2007/0293206 | A1 | 12/2007 | Lund | |
| 2008/0027642 | A1 | 1/2008 | Winberry et al. | |

(56) References Cited

U.S. PATENT DOCUMENTS

| | | | |
|---|---|---|---|
| 2008/0030316 A1 | 2/2008 | Flick | |
| 2008/0046274 A1 | 2/2008 | Geelen et al. | |
| 2008/0059055 A1 | 3/2008 | Geelen et al. | |
| 2008/0064413 A1 | 3/2008 | Breed | |
| 2008/0065325 A1 | 3/2008 | Geelen et al. | |
| 2008/0082221 A1 | 4/2008 | Nagy | |
| 2008/0082225 A1 | 4/2008 | Barrett | |
| 2008/0086508 A1 | 4/2008 | Ballew | |
| 2008/0120175 A1* | 5/2008 | Doering | 705/14 |
| 2008/0177469 A1 | 7/2008 | Geelen et al. | |
| 2008/0221787 A1 | 9/2008 | Vavrus | |
| 2008/0243558 A1 | 10/2008 | Gupte | |
| 2008/0252487 A1 | 10/2008 | McClellan et al. | |
| 2008/0255722 A1 | 10/2008 | McClellan et al. | |
| 2008/0255888 A1 | 10/2008 | Berkobin | |
| 2008/0262670 A1 | 10/2008 | McClellan et al. | |
| 2008/0294690 A1 | 11/2008 | McClellan et al. | |
| 2008/0296968 A1 | 12/2008 | Culbert | |
| 2008/0319602 A1 | 12/2008 | McClellan et al. | |
| 2009/0024273 A1 | 1/2009 | Follmer et al. | |
| 2009/0024419 A1 | 1/2009 | McClellan et al. | |
| 2009/0079555 A1 | 3/2009 | Aguirre De Carcer et al. | |
| 2009/0085728 A1 | 4/2009 | Catten | |
| 2010/0030459 A1 | 2/2010 | Geelen et al. | |
| 2010/0030586 A1 | 2/2010 | Taylor et al. | |
| 2010/0130182 A1 | 5/2010 | Rosen | |
| 2010/0131189 A1 | 5/2010 | Geelen et al. | |
| 2010/0131304 A1 | 5/2010 | Collopy et al. | |
| 2010/0134182 A1 | 6/2010 | Kapoor et al. | |
| 2010/0205012 A1 | 8/2010 | McClellan | |
| 2010/0207751 A1 | 8/2010 | Follmer et al. | |
| 2010/0207787 A1 | 8/2010 | Catten et al. | |
| 2010/0265074 A1 | 10/2010 | Namba et al. | |
| 2011/0115618 A1 | 5/2011 | Catten | |
| 2011/0179080 A1 | 7/2011 | Miyazaki et al. | |
| 2011/0267205 A1 | 11/2011 | McClellan et al. | |
| 2012/0181765 A1 | 7/2012 | Hill et al. | |

FOREIGN PATENT DOCUMENTS

| | | | | |
|---|---|---|---|---|
| CA | 2631103 | | 11/2008 | |
| DE | 197 00 353 | A1 | 7/1998 | B60K 28/00 |
| DE | 19700353 | | 7/1998 | |
| EP | 0 843 177 | A1 | 5/1998 | G01P 1/10 |
| EP | 0921509 | | 6/1999 | |
| EP | 1811481 | A1 * | 7/2007 | |
| GB | 2434346 | A * | 7/2007 | |
| GB | 2454224 | | 5/2009 | |
| JP | 2004326492 | | 11/2004 | |
| JP | 2005-223791 | | 8/2005 | |
| JP | 2005-250825 | | 9/2005 | G07B 15/00 |
| JP | 2007235530 | | 9/2007 | |
| WO | WO 2004019646 | | 3/2004 | |
| WO | WO 2005003885 | | 1/2005 | |
| WO | WO 2005109273 | A1 * | 11/2005 | |
| WO | WO2005109369 | | 11/2005 | |
| WO | WO 2008045320 | | 8/2008 | |
| WO | WO2008109477 | | 9/2008 | |
| WO | WO 2013033756 | | 3/2013 | |
| WO | WO 2013050548 | | 4/2013 | |

OTHER PUBLICATIONS

*Australian Government; IP Australia*; Examiner's First Report for Patent Application No. 2008269142; 3 pages, Jun. 4, 2012.

Ogle, et al.; *Accuracy of Global Positioning System for Determining Driver Performance Parameters*; Transportation Research Record 1818; Paper No. 02-1063; pp. 12-24, Unknown.

Shen, et al.; *A computer Assistant for Vehicle Dispatching with Learning Capabilities*; Annals of Operations Research 61; pp. 189-211, 1995.

Tijerina, et al.; *Final Report Supplement; Heavy Vehicle Driver Workload Assessment; Task 5: Workload Assessment Protocol*; U.S. Department of Transportation; 69 pages, Oct. 1996.

Myra Blanco; *Effects of In-Vehicle Information System (IVIS) Tasks on the Information Processing Demands of a Commercial Vehicle Operations (CVO) Driver*; 230 pages, 1999.

*The State Intellectual Property Office of P. R. China; English Translation of the First Office Action*; for Application No. 200880101242.2; 15 pages, Dec. 7, 2011.

*English Translation of the Patent Abstracts of Japan* for Publication No. JP2005-250825; 42 pages, Sep. 15, 2005.

Japanese Office Action and English Translation of the Text of the First Office Action for Application No. 2010-514773; 7 pages, Sep. 4, 2012.

Chinese Office Action for Application No. 200880101242.2; 7 pages, Sep. 24, 2012.

Zhu et al., "A Small Low-Cost Hybrid Orientation system and Its Error Analysis", Sensors Journal, IEEE—vol. 9, Issue 3, Digital Object Identifier: 10.1109/JSEN.2008.2012196; Publication Year: Mar. 2009, pp. 223-230.

Almazan et al., "Full auto-calibration of a smartphone on board a vehicle using IMU and GPS embedded sensors", Intelligent Vehicles Symposium (IV), 2013 IEEE; Digital Object Identifier: 10.1109/IVS.2013.6629658; Publication Year: Jun. 2013, pp. 1374-1380.

Lupton et al., "Efficient Integration of Inertial Observations Into Visual SLAM Without Initialization", Intelligent Robots and Systems, 2009, IROS 2009, IEEE/RSJ International Conference on: Digital Object Identifier: 10.1109/IROS.2009.5354267, Publication Year: Oct. 2009, pp. 1547-1552.

Mungula et al., "Attitude and Heading System Based on EKF Total State Configuration", Industrial Electronics (ISIE), 2011 IEEE International Symposium on; Digital Object Identifier: 10.1109/ISIE.2011.5984493; Publication Year: Jun. 2011, pp. 2147-2152.

Huddle et al., "Application of Inertial Navigation Systems to Geodetic Position and Gravity Vector Survey", Decision and Control including the 17th Symposium on Adaptive Processes, 1978 IEEE Conference on; vol. 17, Part 1; Digital Object Identifier: 10.1109/CDC.1978.267967; Publication Year: 1978, pp. 459-465. (The month of Publication is irrelevant since the year of Publication is clearly prior to the filing of the Application).

Zhao Yan et al., "Attitude Measurement of Driver's Head Based on Accelerometer and Magnetoresistive Sensor", Fluid Power and Mechatronics (FPM), 2011 International Conference on; Digital Object Identifier: 10.1109/FPM.2011.6045836; Publication Year: Aug. 2011, pp. 613-617.

Phuyal B., "An Experiment for a 2-D and 3-D GPS/INS configuration for land vehicle applications", Position Location and Navigation Symposium, 2004, PLANS 2004, Digital Object Identifier: 10.1109/PLANS.2004.1308987; Publication Year: 2004, pp. 148-152. (The month of Publication is irrelevant since the year of Publication is clearly prior to the filing of the Application).

Roberts et al., "Position Control of VTOL UAVs using IMU and GPS Measurements", Decision and Control and European Conference (CDC-ECC), 2011 50th IEEE Conference on, Digital Object Identifier, 10.1109/CDC.2011.6160854, Publication Year: Dec. 2011, pp. 8082-8087.

Cho et al., "Obeservability Analysis of the INS/GPS Navigation System on the Measurements in Land Vehicle Applications", Control, Automation and Systems, 2007, ICCAS '07, International Conference on Digital Object Identifier: 10.1109/CCAS.2007.4407018, Publication Year: Oct. 2007, pp. 841-846.

Vukajovic et al., "The Practical Design of In-Vehicle Telematics Device with GPS and MEMS Accelerometers", Telecommunications Forum (TELFOR), 2011 19th: Digital Object Identifier: 10.1109/TELFOR.2011.6143692, Publication Year: Nov. 2011, pp. 908-911.

U.S. Appl. No. 11/805,238, Jul. 30, 2009, Office Action.

U.S. Appl. No. 11/755,556, Sep. 1, 2009, Office Action.

U.S. Appl. No. 11/779,176, Mar. 17, 2010, Office Action.

U.S. Appl. No. 11/805,238, Apr. 26, 2010, Notice of Allowance.

U.S. Appl. No. 11/755,556, May 4, 2010, Office Action.

U.S. Appl. No. 11/758,444, Jul. 20, 2010, Office Action.

U.S. Appl. No. 11/805,237, Nov. 8, 2010, Office Action.

U.S. Appl. No. 13/012,660, Feb. 16, 2011, Office Action.

U.S. Appl. No. 12/379,083, Apr. 8, 2011, Office Action.

U.S. Appl. No. 12/379,153, Jul. 29, 2011, Office Action.

U.S. Appl. No. 12/379,154, Aug. 1, 2011, Office Action.

(56) References Cited

OTHER PUBLICATIONS

U.S. Appl. No. 11/805,237, Aug. 8, 2011, Office Action.
U.S. Appl. No. 11/779,176, Aug. 18, 2011, Office Action.
U.S. Appl. No. 11/779,178, Nov. 2, 2011, Office Action.
U.S. Appl. No. 13/012,660, Nov. 14, 2011, Office Action.
U.S. Appl. No. 12/379,083, Nov. 23, 2011, Office Action.
U.S. Appl. No. 12/379,153, Dec. 16, 2011, Office Action.
U.S. Appl. No. 12/379,154, Jan. 30, 2012, Notice of Allowance.
U.S. Appl. No. 11/805,237, Feb. 1, 2012, Office Action.
U.S. Appl. No. 12/379,083, Feb. 2, 2012, Office Action.
U.S. Appl. No. 13/012,660, Apr. 11, 2012, Office Action.
U.S. Appl. No. 11/779,178, May 31, 2012, Office Action.
U.S. Appl. No. 11/805,237, Jun. 15, 2012, Office Action.
U.S. Appl. No. 12/379,153, Jul. 31, 2012, Notice of Allowance.
U.S. Appl. No. 13/012,660, Aug. 1, 2012, Office Action.
U.S. Appl. No. 13/012,660, Nov. 26, 2012, Office Action.
U.S. Appl. No. 11/805,237, Dec. 3, 2012, Office Action.
U.S. Appl. No. 11/779,176, Dec. 3, 2012, Office Action.
U.S. Appl. No. 11/779,178, Dec. 20, 2012, Office Action.
U.S. Appl. No. 13/012,660, Mar. 18, 2013, Office Action.
U.S. Appl. No. 11/779,178, May 9, 2013, Office Action.
U.S. Appl. No. 12/379,083, May 23, 2013, Office Action.
U.S. Appl. No. 11/805,237, Jun. 6, 2013, Office Action.
U.S. Appl. No. 11/779,176, Jul. 1, 2013, Notice of Allowance.
U.S. Appl. No. 13/012,660, Jul. 8, 2013, Office Action.
U.S. Appl. No. 12/379,153, Aug. 14, 2013, Notice of Allowance.
U.S. Appl. No. 12/975,489, Oct. 3, 2013, Office Action.
U.S. Appl. No. 11/755,556, Jun. 10, 2014, Office Action.
U.S. Appl. No. 13/012,660, Jun. 6, 2014, Notice of Allowance.
U.S. Appl. No. 11/758,444, Jun. 27, 2014, Office Action.
U.S. Appl. No. 11/779,178, May 27, 2014, Notice of Allowance.
Google Maps, “Google Maps”, Available at least as early as Dec. 29, 2014. Whole Document.
U.S. Appl. No. 12/379,153, Mar. 17, 2014, Office Action.
U.S. Appl. No. 12/975,489, Oct. 1, 2014, Notice of Allowance.
U.S. Appl. No. 12/379,153, Oct. 6, 2014, Office Action.
U.S. Appl. No. 12/379,153, Jan. 9, 2015, Notice of Allowance.
U.S. Appl. No. 12/379,083, Jan. 3, 2014, Office Action.
U.S. Appl. No. 11/778,178, Feb. 6, 2014, Office Action.
U.S. Appl. No. 13/012,660, Feb. 13, 2014, Office Action.
U.S. Appl. No. 11/758,444, Feb. 21, 2014, Office Action.
U.S. Appl. No. 12/379,083, Mar. 17, 2015, Office Action.
U.S. Appl. No. 11/755,556, Mar. 30, 2015, Notice of Allowance.

* cited by examiner

SYSTEM AND METHOD FOR MONITORING AND IMPROVING DRIVER BEHAVIOR

TECHNICAL FIELD

The present invention relates generally to a system and method for monitoring driver behavior and vehicle driving conditions and, more particularly, to a system and method for monitoring driving against minimum standards and for improving driver behavior

BACKGROUND

Currently there are systems that allow a fleet manager or vehicle owner to track the location of their vehicle(s) such as by using a GPS reporting capability of a cellular phone or other wireless device. These devices may provide additional notification, such as when a vehicle leaves or enters a predefined area (i.e. a geofence) or when the vehicle exceeds a certain speed. However, other than providing such warnings or notifications to a fleet manager, vehicle owner, parent or other supervisor, the current systems provide little or no real-time feedback to the driver to correct their behavior.

Without having a driving instructor or other operator in the vehicle, there is currently no system or method available for providing real-time feedback, training and mentoring to drivers based upon the actual operation of the vehicle (i.e. based upon the driver's behavior while driving). Accordingly, aggressive driver behavior and driver inattention may not be detected and/or corrected, thereby reducing driver and vehicle safety. The absence of feedback as a means to identify unsatisfactory driving behavior dissociates the driver from the infraction; denial is the likely result. However, immediate feedback to infractions or undesirable driving behavior has enormous benefit in mentoring the driver and delineating acceptable from unacceptable driving behavior.

BRIEF SUMMARY

There exists a need in the art for a driver mentoring system that is adaptable for use in various settings, including commercial fleet operators, teen drivers, and new drivers, that monitors at-risk and/or unsafe driver behavior and provides mentoring to the driver in order to reduce adverse driver actions and inactions that may lead to accidents. The present invention relates to a system and method for monitoring driver behavior for use by companies, government agencies, consumers, or the general public. For example, the present invention allows parents to remotely mentor the driving habits of their teen children as well as allow for monitoring of geographic areas into which their children may enter. Moreover, the present invention may also be used by fleet operators to monitor and mentor the driving behavior of experienced drivers.

The vehicle behavior monitoring system disclosed herein provides for real-time reconfiguration of driver performance and vehicle operation parameters and which allows for reporting of such data in order to generate driver profiles and trends. The present invention provides a unique vehicle monitoring system specifically adapted to mentor driver performance in order to improve driver safety and reduce accident rates and formulate various methods to establish and/or delineate "good" driving behavior from "bad" driving behavior.

In one embodiment, the invention is directed to a system and method for providing feedback to drivers. The system monitors selected vehicle parameters while a vehicle is being driven, and detects one or more vehicle operation violations by comparing the selected vehicle parameters to predetermined thresholds. A mentoring message is provided to the driver if the threshold is exceeded. If a vehicle operation violation has not been corrected within a preselected time period, then a violation report may be sent to a third party or a central server. If a vehicle operation violation has not been corrected within a preselected time period, then a different mentoring message may be provided to the driver. Vehicle parameter data may be monitored from an on-board vehicle diagnostic system. The mentoring message may be an audible warning, such as a spoken message, or a visual warning, such as a text message. The selected vehicle parameters may be a vehicle speed, a vehicle speed for the specific road conditions, a vehicle acceleration, an errant lane departure, following too close to a subsequent vehicle, a vehicle seatbelt use, the use of a mobile phone, the detection of unlawful ethanol concentrations, the detection of fatigue (blink rate) and/or other traceable, detectable activities, elements, and/or behaviors.

In another embodiment, a system and method for monitoring vehicle operation, comprises installing a monitoring device in a vehicle, wherein the monitoring device monitors vehicle operation parameters, and wherein the vehicle monitoring device is capable of providing mentoring feedback to a driver. The vehicle operation is monitored without providing the mentoring feedback during a baseline period and baseline vehicle operation data is collected for the baseline period. Baseline vehicle operation data may be collected for multiple vehicles.

After the baseline period, vehicle operation is monitored and mentoring feedback is provided to the driver. Mentored vehicle operation data is collected after the baseline period. The mentored vehicle operation data is compared to the baseline vehicle operation data to determine driving improvement. The vehicle operation parameters for monitoring during the baseline period may be selected by the user. The baseline vehicle operation data and/or mentored vehicle operation data can be transmitted to a central server.

A system and method for establishing a vehicle operation profile, comprises installing a monitoring device in a vehicle, wherein the monitoring device monitors vehicle operation parameters, monitoring vehicle operation during a training period, collecting vehicle operation training data for the training period, and creating the vehicle operation profile based upon the vehicle operation training data. The vehicle operation is then monitored during a monitoring period; and vehicle operation data during the monitoring period is compared to the vehicle operation profile.

Mentoring messages can be provided to a driver based upon differences between the vehicle operation data and the vehicle operation profile. The vehicle operation profile comprises thresholds for the vehicle operation parameters, and vehicle operation data observed during the monitoring period is compared to the thresholds. The vehicle operation parameters to be monitored during the training period and/or during the mentoring period may be selected by a user.

Thresholds are established for vehicle operation parameters based upon the vehicle operation training data. The thresholds correspond to an average observed value of the vehicle operation parameters, a maximum observed value of the vehicle operation parameters, or a selected percentage above a value of the vehicle operation parameters. The user may adjust the thresholds for vehicle operation parameters from an observed value. Alternatively, a user may adjust the thresholds for vehicle operation parameters from value established by the vehicle monitoring system.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention provides many applicable inventive concepts that can be embodied in a wide variety of specific contexts. The specific embodiments discussed are merely illustrative of specific ways to make and use the invention, and do not limit the scope of the invention.

Figure 1:
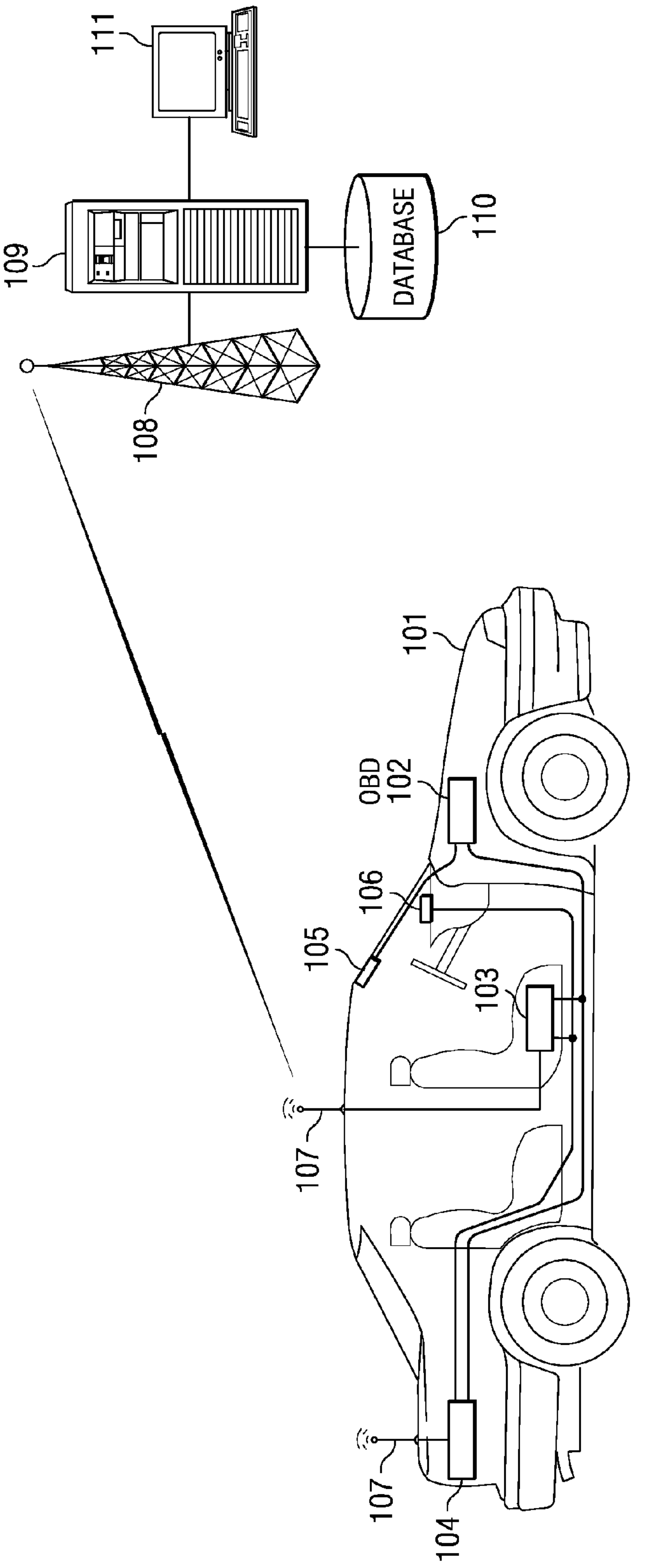
FIG. 1 is a diagram of a system incorporating embodiments of the invention mounted in a vehicle.

With reference now to FIG. 1, there is shown a vehicle 101 in which a vehicle monitoring device is installed. The monitoring device may be self contained, such as a single unit mounted on a windshield 105 or dashboard 106. Alternatively, the monitoring device may include multiple components, such as a processor or central unit mounted under a car seat 103 or in a trunk 104. Similarly, the monitoring device may have a self-contained antenna in the unit (105), or may be connected to remotely mounted antennas 107. The vehicle monitoring units may be connected to an on-board diagnostic (OBD) system or bus in the vehicle. Information and data associated with the operation of the vehicle may be collected from the OBD system, such as engine operating parameters, vehicle identification, seatbelt use, door position, etc. The OBD system may also be used to power the vehicle monitoring device. In one embodiment, the vehicle monitoring device is of the type described in U.S. patent application Ser. No. 11/755,556, filed on May 30, 2007, entitled "System and Method for Evaluating Driver Behavior," the disclosure of which is hereby incorporated by reference herein in its entirety.

Information may be exchanged between the vehicle monitoring system and a central monitoring system or server in real-time or at intervals. For example, the vehicle operation parameters may be transmitted to server 109 via communication network 108, which may be a cellular, satellite, WiFi, Bluetooth, infrared, ultrasound, short wave, microwave or any other suitable network. Server 109 may process the parameters and/or store the data to database 110, which may be part of server 109 or a separate device located nearby or at a remote location. Users can access the data on server 109 and database 110 using terminal 111, which may be co-located with server 109 and database 110 or coupled via the Internet or other network connection. Is some embodiments, the data captured by the monitoring system in vehicle 101 may be transmitted via a hardwired communication connection, such as an Ethernet connection that is attached to vehicle 101 when the vehicle is within a service yard or at a base station. Alternatively, the data may be transferred via a flash memory, diskette, or other memory device that can be directly connected to server 109 or terminal 111. Data, such as driving performance or warning thresholds, may also be uploaded from the central server to the vehicle monitoring device in a similar manner.

In one embodiment of the invention, the data captured by the vehicle monitoring system is used to monitor, mentor or other wise analyze a driver's behavior during certain events. For example, if the vehicle is operated improperly, such as speeding, taking turns too fast, colliding with another vehicle, or driving in an unapproved area, then a supervisor may want to review the data recorded during those events to determine what the driver was doing at that time and if the driver's behavior can be improved. Additionally, if the driver's behavior is inappropriate or illegal, such as not wearing a seatbelt or using a cell phone while driving, but does not cause the vehicle to operate improperly, a supervisor may also want to review the data recorded during those events.

Figure 2:
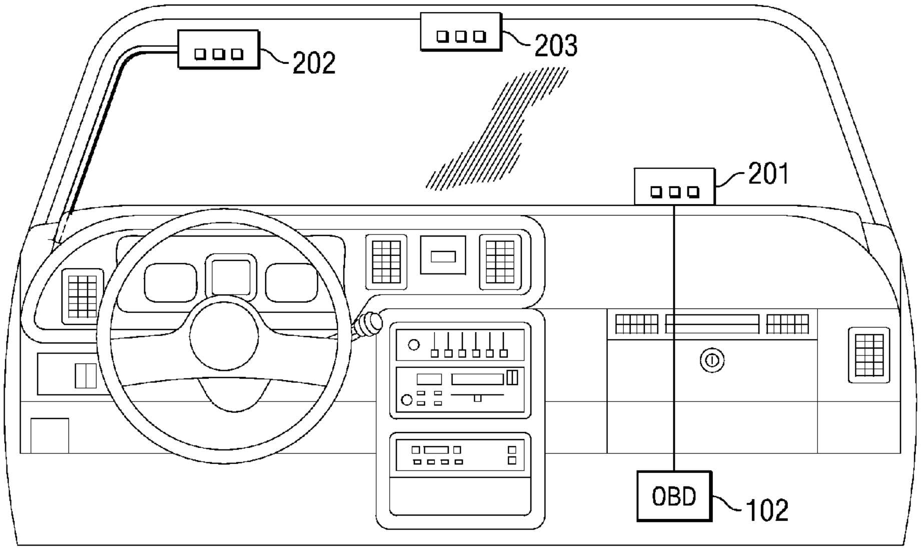
FIG. 2 is a diagram of possible locations of cameras and/or other technologies used in embodiments of the invention.

Referring to FIG. 2, exemplary mounted locations for the vehicle monitoring system are illustrated, such as on a dashboard 201, windshield 202, or headliner 203. It will be understood that all or parts of the vehicle monitoring system may be mounted in any other location that allows for audio and/or visual feedback to the driver of the vehicle while the vehicle is in operation. Monitoring device 201 is illustrated as being coupled to OBD 102, from which it may receive inputs associated with vehicle operating parameters. Monitoring devices 202 and 203 may be similarly coupled to OBD 102 (connections not shown). Moreover, the vehicle monitoring system may be coupled to other sensors, such as a sensor for detecting the operation and use of a cellular or wireless device in the vehicle.

In one aspect of the invention, the vehicle monitoring system includes an accelerometer module (XLM) that includes at least one accelerometer for measuring at least one of lateral (sideways), longitudinal (forward and aft) and vertical acceleration in order to determine whether the driver is operating the vehicle in an unsafe or aggressive manner. For example, excessive lateral acceleration may be an indication that the driver is operating the vehicle at an excessive speed around a turn along a roadway. Furthermore, it is possible that the driver may be traveling at a speed well within the posted speed limit for that area of roadway. However, excessive lateral acceleration, defined herein as "hard turns," may be indicative of aggressive driving by the driver and may contribute to excessive wear on tires and steering components as well as potentially causing the load such as a trailer to shift and potentially overturn.

As such, it can be seen that monitoring and mentoring such driver behavior by providing warnings to the driver during the occurrence of aggressive driving such as hard turns can improve safety and reduce accidents. In addition, mentoring such aggressive driver behavior can reduce wear and tear on the vehicle and ultimately reduce fleet maintenance costs as well as reduce insurance costs and identify at risk drivers and driving behavior to fleet managers.

The vehicle monitoring system may further include a self-contained and tamper-resistant event data recorder or crash data recorder (CDR), such as, for example, the CDR which is shown and disclosed in U.S. Pat. Nos. 6,266,588 and 6,549,834 issued to McClellan et al., (the disclosures of which are hereby incorporated by reference herein in their entirety) and which is commercially known as "Witness" and commercially available from Independent Witness, Inc. of Salt Lake City, Utah. The CDR is adapted to continuously monitor vehicle motion and begin recording upon supra-threshold impacts whereupon it records the magnitude and direction of accelerations or G-forces experienced by the vehicle as well as recording an acceleration time-history of the impact event and velocity change between pre- and post-impact for a configurable duration following the impact. The CDR may be separate from the accelerometer module (XLM) or may be the same device.

In one aspect, the vehicle monitoring system may be in data communication with an on board diagnostic (OBD) TI system of the vehicle such as via a port. In some vehicle models, the vehicle monitoring system is in data communication with a controller area network (CAN) system (bus) to allow acquisition of certain vehicle operating parameters including, but not limited to, vehicle speed such as via the speedometer, engine speed or throttle position such as via the tachometer, mileage such as via the odometer reading, seat belt status, condition of various vehicle systems including anti-lock-braking (ABS), turn signal, headlight, cruise control activation and a multitude of various other diagnostic parameters such as engine temperature, brake wear, and the like. The OBD or CAN allows for acquisition of the above-mentioned vehicle parameters for processing thereby and/or for subsequent transmission to the central server 109.

The vehicle monitoring system may also include a GPS receiver (or other similar technology designed to track location) configured to track the location and directional movement of the vehicle in either real-time or over-time modes. As is well known in the art, GPS signals may be used to calculate the latitude and longitude of a vehicle as well as allowing for tracking of vehicle movement by inferring speed and direction from positional changes. Signals from GPS satellites also allow for calculating the elevation and, hence, vertical movement, of the vehicle.

Embodiments of the vehicle monitoring system may further include a mobile data terminal (MDT) mounted for observation and manipulation by the driver, such as near the vehicle dash. The MDT preferably has an operator interface such as a keypad, keyboard, touch screen, display screen or any suitable user input device and may further include audio input capability such as a microphone to allow voice communications. The MDT may include at least one warning mechanism such as a speaker and/or a warning light for warning the driver of violation of posted speed limits and/or exceeding acceleration thresholds in lateral, longitudinal and vertical directions as an indication of hard turns, hard braking or hard vertical, respectively.

The vehicle monitoring system receives inputs from a number of internal and external sources. The OBD II/CAN bus, which provides data from the vehicle's on-board diagnostic system, including engine performance data and system status information. A GPS receiver provides location information. The CDR, XLM, or accelerometers provide information regarding the vehicle's movement and driving conditions. Any number of other sensors, such as but not limited to, a seat belt sensor, proximity sensor, driver monitoring sensors, or cellular phone use sensors, also provide inputs to the vehicle monitoring system.

The vehicle monitoring system compares these inputs to preset thresholds and determines when an exception condition occurs or when a threshold is exceeded that requires an alarm to be generated in the vehicle. The alarm may be an audible and/or visual warning for the vehicle occupants. Additionally, any of the data collected may be passed on to server 109 or database 110 where it may be further processed or accessed. The vehicle operation thresholds may be entered directly into the vehicle monitoring system or may be received as updated, revised, or corrected rule sets, commands or logic from server 109.

The vehicle monitoring system may have any type of user interface, such as a screen capable of displaying messages to the vehicle's driver or passengers, and a keyboard, buttons or switches that allow for user input. The system or the user interface may have one or more status LEDs or other indicators to provide information regarding the status of the device's operation, power, communications, GPS lock, and the like. Additionally, the LEDs or other indicators may provide feedback to the driver when a driving violation occurs. Additionally, monitoring system may have a speaker and microphone integral to the device.

The monitoring system may be self-powered, such as by a battery, or powered by the vehicle's battery and/or power generating circuitry. Access to the vehicle's battery power may be by accessing the power available on the vehicle's OBD and/or CAN bus.

The vehicle monitoring system may be self-orienting, which allows it to be mounted in any position, angle or orientation in the vehicle or on the dashboard. In embodiments of the invention, the vehicle monitoring system determines a direction of gravity and a direction of vehicle movement and determines its orientation within the vehicle using this information. In order to provide more accurate measurements of driver behavior, in one embodiment, the present invention filters gravitational effects out of the longitudinal, lateral and vertical acceleration measurements when the vehicle is on an incline or changes its horizontal surface orientation. Driver performance is monitored and mentored using the accelerometer module, which preferably will be a tri-axial accelerometer. Acceleration is measured in at least one of lateral, longitudinal and/or vertical directions over a predetermined time period, which may be a period of seconds or minutes. An acceleration input signal is generated when a measured acceleration exceeds a predetermined threshold.

It will be understood that the present invention may be used for both fleets of vehicles and for individual drivers. For example, the vehicle monitoring system described herein may be used by insurance providers to monitor and/or mentor the driving behavior of customers and to use collected data to set insurance rates. A private vehicle owner may also use the present invention to monitor the use of the vehicle. For example, a parent may use the system described herein to monitor a new driver or a teenaged driver.

An embodiment of the invention provides real-time mentoring, training, or other feedback to a driver while operating the vehicle. The mentoring is based upon observed operation of the vehicle and is intended to change and improve driver behavior by identifying improper or illegal operation of the vehicle. Using preset criteria or thresholds, the vehicle monitoring system identifies when the vehicle is operated outside the criteria or beyond the preset thresholds to determine that a violation has occurred.

Numerous parameters may be measured by the vehicle monitoring system and used to provide driver mentoring. Speeding criteria, such as driving above a maximum speed limit, violation of a posted speed limit in a speed-by-street database, or violating a speed limit in a designated zone, may cause the vehicle monitoring system to warn the driver. U.S. patent application Ser. No. 11/805,238, filed May 22, 2007, entitled "System and Method for Monitoring and Updating Speed-By-Street Data," the disclosure of which is hereby incorporated by reference herein in its entirety, describes the use of speed-by-street information by a vehicle monitoring system. Upon detection of the speeding violation, the monitoring system will provide an audible and/or visual warning to the driver. For example, a spoken message identifying the speeding condition or a spoken message instructing the driver to slow down may be played to the driver. Alternatively, a selected tone or buzzer may sound when a speeding violation occurs. A visual warning, such as an LED warning light may illuminate or flash to notify the driver of a violation.

The vehicle monitoring system may identify aggressive driving violations. For example, based upon the inputs from an acceleration module or CDR, aggressive driving events may be detected, such as exceeding acceleration thresholds in a lateral, longitudinal, or vertical direction, hard turns, hard acceleration or jackrabbit starts, hard braking, and/or hard vertical movement of the vehicle. Visual and/or audible warnings may be played or displayed to the driver upon a violation of an acceleration threshold.

Other violations, such as operating the vehicle outside or inside a specific area or off of a specific route can trigger a visual or audible mentoring message to the driver. Areas and routes may be defined, for example, using a geofence that is compared to the vehicle's current location as determined by the GPS system. Seat belt use violation, such as failing to use a seatbelt while driving, may be detected, for example, via the OBD bus and may trigger a mentoring message to use the seatbelt. Sensors that detect exposure to ethanol (EtOH) vapor and/or detect blood EtOH levels, may be used to determine if a driver has been drinking and may have a blood alcohol level that is illegal. Based upon inputs from an EtOH sensor, the vehicle monitoring device may provide mentoring feedback to the driver or may disable the vehicle. Other sensors may detect the use of wireless devices, such as cell phones, in the vehicle. Upon detecting cell phone use, the vehicle monitoring system may issue a warning to the driver to stop using the cell phone.

In one embodiment, the present invention provides real-time automatic exception alerts and reporting in the form of e-mail, phone calls, or pages to facilitate intervention and to change driver behavior. Such reporting, such as to a parent, fleet manager, supervisor, or other authority, may be made immediately upon detection of the violation or may occur if the violation is not corrected within a predetermined period of time. The alerts may contain, for example, driver performance reports such as a speeding index, "harsh" driving (e.g. acceleration, braking, turning, vertical indices) conditions, a seatbelt index and the like. The vehicle monitoring system may be configured to provide an immediate alert, or a grace period may be configured to allow the driver to correct the violation. If the violation is corrected by the driver, then no alert is sent to report the violation, thereby allowing the vehicle monitoring system to mentor the driver without human intervention.

The present invention to combines triggering events with visual and/or audible warning to change driver behavior. The mentoring messages may be configured by event or violation. For a selected parameter, such as vehicle speed, a user may configure one or more thresholds that, when exceeded, trigger a mentoring message. The type and content of the mentoring messages are also configurable. For example, audible and/or visual warnings may be assigned to each threshold criteria so that, upon reaching the threshold speed, for example, a selected warning is played or displayed. The warnings may be further configured to change over time. For example, audible warnings, such as tones or buzzers, may increase in volume or frequency or may change to different sound if the triggering violation is not corrected. A spoken message warning, such as "speeding violation" or "slow down," may be repeated more frequently and/or louder if the speeding violation is not corrected. Alternatively, the spoken message may change to a different message and/or a different voice if the triggering event is not stopped. Visual messages, such as warning lights, may change from flashing to steady (or visa versa) if the violation continues. Text warning messages may also be displayed to the user and may change over time.

Figure 3:
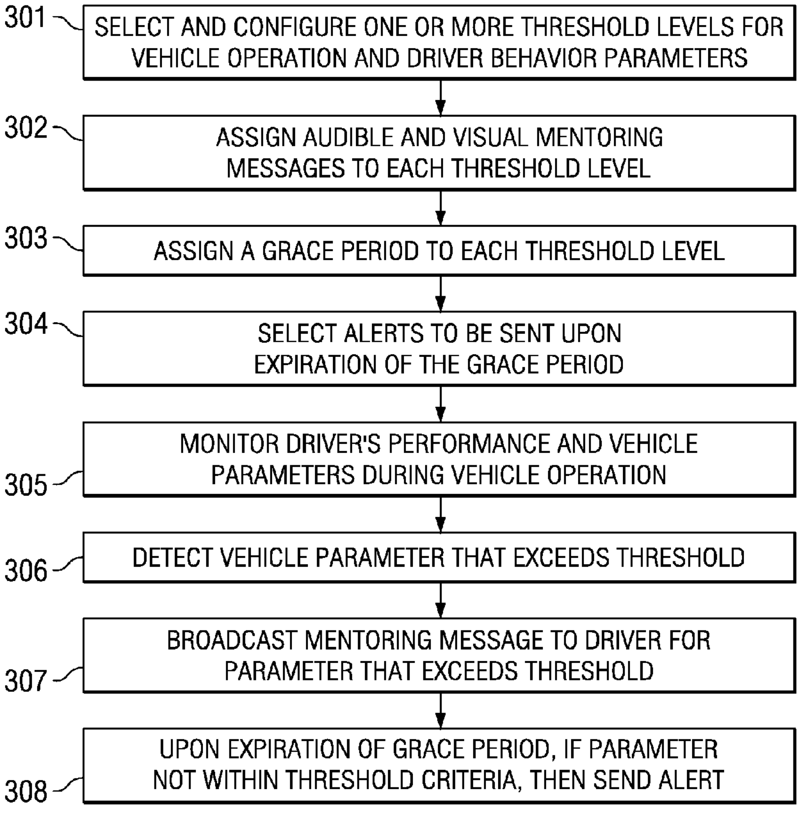
FIG. 3 is a flowchart illustrating one process for implementing the present invention.

FIG. 3 is a flowchart illustrating one process for implementing the present invention. In step 301, a user selects and configures one or more threshold levels for parameters associated with vehicle operation and driver behavior. As noted above, these parameters may be a speeding parameter, an acceleration parameter, a seatbelt notice parameter, or any other parameter that may be measured by the vehicle monitoring system. Multiple thresholds may be assigned to a parameter, such as multiple levels of speeding thresholds to detect progressively worse speeding violations. In step 302, the user assigns audible and visual mentoring messages to each threshold level that was selected in step 301. For example, a visual mentoring message, such as a warning light, may be assigned to a first speeding threshold, the warning light may be assigned to flash if a second speeding threshold is exceeded, and an audible message may be played if a third speeding threshold is exceeded.

For thresholds assigned in step 301, a grace period is assigned in step 303. The grace period may be a number of seconds or minutes. The grace period corresponds to a period of time in which the driver is allowed to correct a violation without triggering a report to a third party. The grace period may also be zero (i.e. no time for correction of the violation). In step 304, alerts are selected for the thresholds assigned in step 301. The alerts are messages or reports to be sent to third parties, such as a fleet manager, parent or supervisor, if the grace period expires and the violation has not been corrected.

In step 305, the vehicle monitoring device monitors vehicle parameters and thereby monitors the driver's performance while operating the vehicle. When a vehicle parameter exceeds the corresponding threshold set in step 301, the violation is detected in step 306. The vehicle monitoring system broadcasts the selected mentoring message to the driver. The mentoring message may be played and/or displayed one time or may be configured to repeat. If the violation has not been corrected, and the parameter is not back within the threshold criteria upon expiration of the grace period, then the selected alert is sent to the designated recipient in step 308.

The threshold criteria, mentoring messages, grace periods, and alerts selected and configured in steps 301-304 may be specific to a particular vehicle or driver. Alternatively, the variables may be selected for a group of drivers based on employer, age, experience or other criteria, for a type of vehicle, for an entire fleet of drivers or vehicles, or for any other group of one or more vehicles or drivers. The threshold criteria may be manually entered into the monitoring system on a vehicle-by-vehicle basis. Alternatively, an operator may select the threshold criteria on terminal 111, for example, and then transmit the criteria wirelessly or by wireline connection to the monitoring system in one or more vehicles.

In one embodiment, a baseline measurement is made for driver performance before the vehicle monitoring system begins providing mentoring to the driver. The baseline data can later be used to measure improvement in driver performance. The baseline data may be specific to single driver or to individual drivers. Alternatively, the baseline data may represent information from a fleet of drivers.

Figure 4:
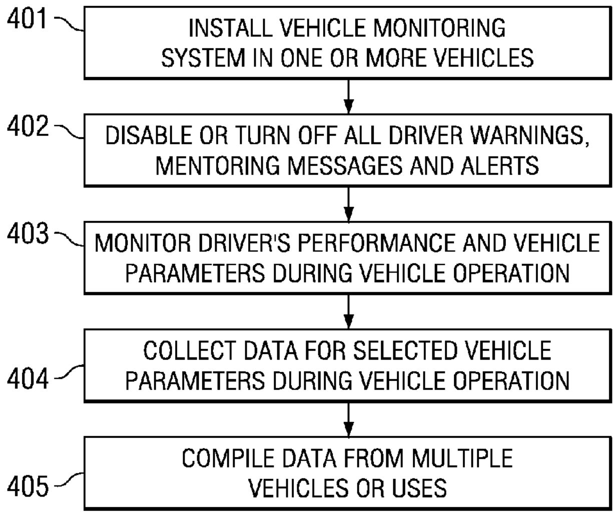
FIG. 4 illustrates a process for measuring baseline data.

FIG. 4 illustrates a process for measuring baseline data. In step 401, vehicle monitoring systems are installed in one or more vehicles. Multiple vehicles in a fleet with many drivers or a single vehicle driven by a single driver may be used to determine the baseline data. In step 402, all driver warnings, mentoring messages and alerts are disabled or turned off so that the drivers will not receive any feedback during the baseline measurement. It is important for the drivers to operate their vehicles "normally" during the baseline measurement and for them to drive as they have historically. By turning off all feedback from the monitoring devices, the driver will be less likely to change his usually driving behavior during the baseline period. In step 403, the vehicle monitoring system monitors the driver's performance and the vehicle's parameters while the vehicle is being driven. In step 404, data is collected during the baseline period for selected vehicle parameters. Data for all of the measurable or detectable parameters may be collected during this period, or data for only selected parameters may be recorded. Finally, in step 405, the data from multiple vehicles, trips, or users is collected and compiled to create a baseline measurement for a fleet of vehicles.

Following the baseline period, the monitoring system will have collected information such as an average number of seatbelt violations for a driver per day, an average number of speeding violations per day, an average amount of excess speed (MPH) per speeding violation, an average number of jackrabbit starts per trip, and similar measurements. It will be understood that the collected data may be analyzed in any number of ways depending upon the requirements of a user. For example, data such as the total number of violations per parameter, an average number of violations per time period, or an average number of violations per driver, may be determined. Additional data, such as the amount of time elapsed until a violation is corrected, may also be collected.

The baseline data may be collected by individual vehicle monitoring systems and then uploaded, such as wirelessly, by wireline connection or by memory device, to server 109. A user can then review and analyze the baseline data via terminal 111. By reviewing the baseline data, the user may be able to identify violations that occur most frequently, that take the longest to correct, or that are most dangerous. The baseline data can then be used to determine and set mentoring thresholds for drivers. The mentoring thresholds may be set as single standard for an entire fleet, or may be tailored to individual drivers. For example, if the baseline data shows few incidents of seatbelt violations, the user may decide not to provide mentoring feedback for seatbelt violations or that a low-key mentoring message would be used. On the other hand, if speeding violations were more common than expected, the user could set multiple speeding thresholds with progressively shrill mentoring message to focus the driver feedback on the speeding violations.

In another embodiment, the monitoring system or device installed in a vehicle may be placed in a training mode. While in the training mode, the vehicle monitoring device observes the operation of the vehicle over a period of time and establishes a profile of good or acceptable driving behavior. The training mode allows the vehicle monitoring system to learn how the vehicle should be operated by observing an experienced driver, for example. When the device training period is completed, the vehicle monitoring system is switched to a monitoring mode. In the monitoring mode, the vehicle monitoring system provides feedback to the driver based upon the driving profile observed and recorded while in the training mode.

The training mode may be used, for example, by a parent who has installed a vehicle monitoring device in a family car. After installation, the vehicle monitoring device is set to training mode and the parent drives the car for sufficient time, such as for several days or weeks, to create a profile of acceptable driving. After the device has observed sufficient vehicle use in the training mode, the vehicle monitoring system is set to monitoring mode and a new driver, teen driver, or any other family members will get feedback and mentoring from the vehicle monitoring system based upon the driving behavior observed in the training mode. Similarly, a vehicle monitoring device installed in a commercial, government, or fleet vehicle may be placed in a training mode while an experienced driver, supervisor, or driving instructor operates the vehicle. Once a driving profile has been created for the vehicle, the monitoring system is switched to monitoring mode and other drivers will receive feedback and mentoring from the device based upon the learned profile.

The parameters observed during a training mode may be a default standard for all users or may be selected by individual users, thereby allowing each user to highlight particular areas of interest. While in the training mode, for example, the vehicle monitoring system may observe the experienced driver's compliance with speed limits as compared to a speed-by-street database, the average and maximum speeds driven on various types of roads, the typical starting and braking accelerations, typical lateral acceleration in turns, and occurrences seatbelt or cellular phone use. The vehicle monitoring system stores or remembers the measured parameters, such as acceleration, deceleration, signaling in lane changes, degree of aggressiveness in turns, and the like. The vehicle monitoring system collects this data and establishes thresholds for various vehicle operation parameters, such as speeding and acceleration thresholds. These thresholds establish a good or acceptable driving standard for that vehicle. There may be one or more drivers of the vehicle during the training mode, such as both parents driving a family car. The vehicle monitoring device may or may not be notified that different drivers are using the vehicle. The vehicle monitoring device may create a single acceptable driving profile based upon all users of the vehicle. Alternatively, multiple acceptable profiles may be created, such as one per driver in the training mode. One of the training profiles may then be selected for use in the monitoring mode.

Using the training or learning mode, the present invention allows the vehicle monitoring system to provide appropriate feedback to drivers based upon the typical use of that vehicle by experience drivers. For example, during a training mode, if a parent typically exceeds speed limits by 5 MPH, uses the seatbelt for each drive, never does jackrabbit starts, and tends to brake hard in stops, then those parameters will be applied to a teen driver in the monitoring mode. For example, the vehicle monitoring system may set a first speeding threshold at 5 MPH above posted speed limits. If the teen driver operates the vehicle in the same manner as the parent, few or no mentoring messages would be broadcast to the teen driver. However, if the teen driver does not use a seatbelt and tends to do jackrabbit starts, then those events will trigger mentoring messages or warnings from the vehicle monitoring system.

When the training mode is completed, and the vehicle monitoring system has created a profile of acceptable driving parameters, those parameters are stored in memory in the monitoring device. The acceptable driving parameters may be reviewed by the experienced driver, such as via a display on the vehicle monitoring system. The acceptable driving parameters may also be sent to central server 109 or other computer for review by the experienced driver or others, such as via terminal 111. The parameters and thresholds observed during the training mode may be reviewed at any time during the training period or after the training is completed. The parent, supervisor or experienced driver accept all of the parameters and thresholds established during the training period for use during the monitoring mode, or those parameters and thresholds may be used as initial values that can be further adjusted for use in the monitoring mode. For example, a parent reviewing his driving parameters captured during training period may determine that certain features of his driving should not be emulated, such as excessive speeding violations or failure to use seatbelts. The parent may adjust the thresholds for these elements to require more strict compliance by the teen driver in the monitoring mode.

Figure 5:
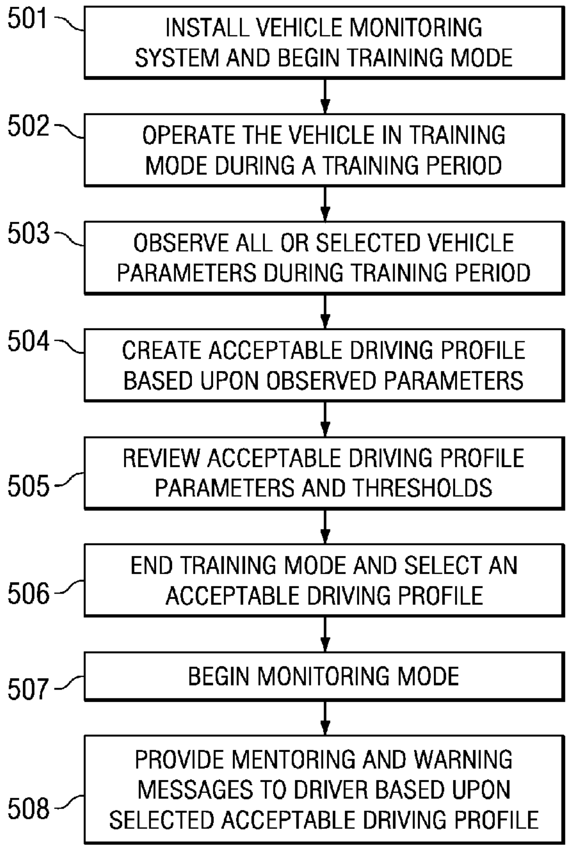
FIG. 5 illustrates a process for creating an acceptable driving profile.

FIG. 5 illustrates a process for creating an acceptable driving profile. In step 501, a vehicle monitoring system is installed and the training mode is started. In step 502, the vehicle is operated by a parent, driving instructor or other experienced driver in the training mode during a training period. In step 503, the vehicle monitoring system observes all or selected vehicle parameters during the training period. The observed parameters may be all of the parameters measurable by the monitoring system or a default subset of those parameters, or a user may select specific parameters to be observed. In step 504, the vehicle monitoring system creates an acceptable driving profile based upon the observed parameters. The parent or experienced driver may review the acceptable driving profile parameters and thresholds in step 505. The parent, experienced driver or other authority may change the selection of parameters to be observed during the training period. The thresholds generated by the vehicle monitoring system during the training mode may also be adjusted, if, for example, those thresholds are too strict or lenient. In step 506, the training mode ends and a profile representing acceptable driving behavior is selected. The monitoring mode is started in step 507, and from that point on, in step 508, the monitoring device provides mentoring and warning messages to the driver based upon selected acceptable driving profile.

In one embodiment, the vehicle monitoring system does not immediately apply the thresholds set in the training mode. Instead, when the monitoring mode starts, the vehicle monitoring device sets the mentoring and warning thresholds at values 30%, for example, above those set during the training mode. Then after some period of time, such as after one week, the thresholds are moved to 20%, for example, of the training mode values. This stair-step approach would allow the driver in the training mode to improve his or her performance over time without having to be "perfect" or having to meet the training mode criteria immediately. Ultimately, the vehicle monitoring system may set the thresholds to the values established during a training mode, or the monitoring mode thresholds may always remain at some value above the training mode, such as 5-10% higher than what was observed during the training mode.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method for monitoring driver behavior and for providing corresponding feedback, the method comprising:

a computing system that includes at least one processor, monitoring at least one vehicle parameter during operation of a vehicle;

the computing system detecting a vehicle operation violation when the at least one vehicle parameter exceeds a corresponding threshold associated with the at least one vehicle parameter;

the computing system causing a first warning to be rendered to a driver at one or more feedback devices in the vehicle in response to detecting that the at least one vehicle parameter exceeds the corresponding threshold;

the computing system, in response to detecting that the vehicle operation violation continues to persist without being corrected for a first predetermined period of time after the first warning is rendered, causing a corresponding report violation to be generated; and the computing system, in response to detecting that the vehicle operation violation continues to persist without being corrected after the first warning is rendered, causing a second warning to be rendered to the driver at the one or more feedback devices in the vehicle, wherein the second warning is rendered differently or is of a different type than the first warning.

2. The method of claim 1, wherein the method further includes monitoring a plurality of different types of parameters associated with a plurality of different corresponding thresholds.

3. The method of claim 2, wherein the method further includes generating a different type of alert for each different type of violation that occurs when the plurality of different types of parameters exceed the corresponding thresholds.

4. The method of claim 2, wherein the plurality of different types of parameters includes a proximity of the vehicle to another vehicle.

5. The method of claim 2, wherein the plurality of different types of parameters includes a fatigue level measured by at least a blink rate of the driver.

6. The method of claim 2, wherein the plurality of different types of parameters includes ethanol detection.

7. The method of claim 2, wherein the plurality of different types of parameters includes detected phone use.

8. The method of claim 2, wherein the plurality of different types of parameters includes hard turns.

9. The method of claim 2, wherein the plurality of different types of parameters includes accelerations.

10. The method of claim 2, wherein the plurality of different types of parameters includes seat belt use.

11. The method of claim 1, wherein the second warning is rendered at a different volume than the first warning.

12. The method of claim 1, wherein the second warning is rendered with different content than the first warning.

13. The method of claim 1, wherein the second warning includes visual and aural warnings.

14. The method of claim 1, wherein the method further includes increasing a frequency for rendering warnings over time as the vehicle operation violation continues to persist without being corrected.

15. The method of claim 1, wherein the method further includes setting the corresponding threshold from data obtained while monitoring the at least one vehicle parameter from the vehicle during a baseline period.

16. The method of claim 1, wherein the one or more feedback devices includes one or more speakers.

17. The method of claim 1, wherein the one or more feedback devices includes one or more visual feedback devices.

18. The method of claim 1, wherein the method includes sending the report to a third party.

19. A vehicle monitoring system comprising:

one or more sensors connected to a vehicle;

one or more feedback devices;

at least one processor; and one or more monitoring devices connected to the one or more sensors, the one or more feedback devices and the at least one processor, the one or more monitoring devices being configured to implement a method for monitoring driver behavior detected by the one or more sensors and for providing corresponding feedback at the one or more feedback devices, wherein the method includes:

monitoring at least one vehicle parameter during operation of the vehicle;

detecting a vehicle operation violation when the at least one vehicle parameter exceeds a corresponding threshold associated with the at least one vehicle parameter;

causing a first warning to be rendered to a driver at the one or more feedback devices in the vehicle in response to detecting that the at least one vehicle parameter exceeds the corresponding threshold;

in response to detecting that the vehicle operation violation continues to persist without being corrected for a first predetermined period of time after the first warning is rendered, causing a corresponding report violation to be generated; and in response to detecting that the vehicle operation violation continues to persist without being corrected after the first warning is rendered, causing a second warning to be rendered to the driver at the one or more feedback devices in the vehicle, wherein the second warning is rendered differently or is of a different type than the first warning.

20. The vehicle monitoring system of claim 19, wherein the method further includes monitoring a plurality of different types of parameters associated with a plurality of different corresponding thresholds.

21. The vehicle monitoring system of claim 20, wherein the plurality of different types of parameters includes detected phone use.

22. The vehicle monitoring system of claim 21, wherein the computer monitoring system is a distributed computing system.

23. The vehicle monitoring system of claim 20, wherein the method further includes generating a different type of alert for each different type of violation that occurs when the plurality of different types of parameters exceed the corresponding thresholds.

24. The vehicle monitoring system of claim 20, wherein the plurality of different types of parameters includes a proximity of the vehicle to another vehicle.

25. The vehicle monitoring system of claim 20, wherein the plurality of different types of parameters includes a fatigue level measured by at least a blink rate of the driver.

26. The vehicle monitoring system of claim 20, wherein the plurality of different types of parameters includes ethanol detection.

27. The method of claim 20, wherein the plurality of different types of parameters includes jack rabbit starts.

28. The vehicle monitoring system of claim 19, wherein the second warning is rendered at a different volume than the first warning.

29. The vehicle monitoring system of claim 19, wherein the second warning is rendered with different content than the first warning.

30. The vehicle monitoring system of claim 19, wherein the second warning includes visual and aural warnings.

31. The vehicle monitoring system of claim 19, wherein the method further includes increasing a frequency for rendering warnings over time as the vehicle operation violation continues to persist without being corrected.

32. The vehicle monitoring system of claim 19, wherein the method further includes setting the corresponding threshold from data obtained while monitoring the at least one vehicle parameter during a baseline period.

33. The vehicle monitoring system of claim 19, wherein the method includes sending the report to a third party.

34. The vehicle monitoring system of claim 19, wherein the computing system is a distributed computing system.

35. The vehicle monitoring system of claim 19, wherein the one or more feedback devices includes one or more speakers.

36. The vehicle monitoring system of claim 19, wherein the one or more feedback devices includes one or more lights.

37. A hardware storage device having stored computer-executable instructions which, when executed by at least one processor of a computer monitoring system, implement a method for the computer monitoring system monitoring driver behavior detected by one or more sensors and for providing corresponding feedback at one or more feedback devices, wherein the method includes:

the computer monitoring system monitoring at least one vehicle parameter during operation of the vehicle;

the computer monitoring system detecting a vehicle operation violation when the at least one vehicle parameter exceeds a corresponding threshold associated with the at least one vehicle parameter;

the computer monitoring system causing a first warning to be rendered to a driver at the one or more feedback devices in the vehicle in response to detecting that the at least one vehicle parameter exceeds the corresponding threshold;

the computer monitoring system, in response to detecting that the vehicle operation violation continues to persist without being corrected for a first predetermined period of time after the first warning is rendered, causing a corresponding report violation to be generated; and the computer monitoring system, in response to detecting that the vehicle operation violation continues to persist without being corrected after the first warning is rendered, causing a second warning to be rendered to the driver at the one or more feedback devices in the vehicle, wherein the second warning is rendered differently or is of a different type than the first warning.

38. The hardware storage device of claim 37, wherein the method further includes:

monitoring a plurality of different types of parameters associated with a plurality of different corresponding thresholds; and generating a different type of alert for each different type of violation that occurs when the plurality of different types of parameters exceed the corresponding thresholds.

39. The hardware storage device of claim 38, wherein the plurality of different types of parameters includes at least one of proximity of the vehicle to another vehicle, jack rabbit starts or hard turns.

40. The hardware storage device of claim 38, wherein the plurality of different types of parameters includes at least one of driver fatigue level, ethanol detection, seat belt use or phone use.

41. The hardware storage device of claim 37, wherein the second warning is rendered differently than the first warning.

42. The hardware storage device of claim 37, wherein the second warning is of a different type than the first warning.

43. The hardware storage device of claim 37, wherein the method further includes setting the corresponding threshold based on monitoring the at least one vehicle parameter from the vehicle during a baseline period.

44. The hardware storage device of claim 37, wherein the method includes sending the report to a third party.

* * * * *

UNITED STATES PATENT AND TRADEMARK OFFICE

CERTIFICATE OF CORRECTION

PATENT NO. : 9,129,460 B2
APPLICATION NO. : 11/768056
DATED : September 8, 2015
INVENTOR(S) : McClellan et al.

It is certified that error appears in the above-identified patent and that said Letters Patent is hereby corrected as shown below:

Title Page

Page 7, under item (56) References Cited, Other Publications, column 2, between lines 5 and 6
Add "U.S. Appl No. 11/805,237, Oct. 28, 2013, Notice of Allowance"

In the Specification

Column 5
Line 6, change "(OBD) TI" to --(OBD) II--

Column 8
Line 35, change "the driver." to --the driver in step 307.--

Signed and Sealed this
Twenty-eighth Day of June, 2016

Michelle K. Lee
*Director of the United States Patent and Trademark Office*